US010363862B1

(12) United States Patent
Kinney

(10) Patent No.: US 10,363,862 B1
(45) Date of Patent: Jul. 30, 2019

(54) ADVANCED WARNING LIGHTING SYSTEMS AND METHODS

(71) Applicant: Kinney ASWD Holding Company, LLC, Madison, AL (US)

(72) Inventor: Gary Wayne Kinney, Madison, AL (US)

(73) Assignee: Kinney ASWD Holding Company, LLC, Huntsville, AL (US)

( * ) Notice: Subject to any disclaimer, the term of this patent is extended or adjusted under 35 U.S.C. 154(b) by 0 days.

(21) Appl. No.: 16/177,924

(22) Filed: Nov. 1, 2018

Related U.S. Application Data

(63) Continuation-in-part of application No. 16/046,625, filed on Jul. 26, 2018.

(51) Int. Cl.
*B60Q 1/00* (2006.01)
*B60Q 1/26* (2006.01)
*A42B 3/04* (2006.01)
*H04L 12/40* (2006.01)

(52) U.S. Cl.
CPC .......... *B60Q 1/2676* (2013.01); *A42B 3/0453* (2013.01); *B60Q 1/2673* (2013.01); *A42B 3/044* (2013.01); *H04L 2012/40215* (2013.01)

(58) Field of Classification Search
CPC ..... A42B 3/0433; A42B 3/044; A42B 3/0453; A42B 3/046; B60Q 1/2673; B60Q 1/2676; B60Q 290/30; H04B 1/3827; H04B 1/3833; H04B 1/385; H04B 2001/3866

See application file for complete search history.

(56) References Cited

U.S. PATENT DOCUMENTS

2005/0134439 A1* 6/2005 Moore ................ A42B 3/0453
340/432
2014/0131128 A1* 5/2014 Schuhmacher .......... B62J 17/04
180/219
2018/0289095 A1* 10/2018 Catterson ............... A42B 3/303

* cited by examiner

Primary Examiner — Van T Trieu
(74) Attorney, Agent, or Firm — Dennen IP Law, LLC

(57) ABSTRACT

An advanced warning light system of the present disclosure has a controller area network (CAN) bus for transmitting messages and at least one controller that monitors operations of a motorcycle, the at least one controller further transmits a message on the CAN bus when a monitored operation occurs on the motorcycle, the message having data indicating that the vehicle is slowing down. The system further has a processor that receives the message from the CAN bus indicating that the vehicle is slowing down, the processor further illuminates an advanced warning light on a back of a helmet being worn by a rider to indicate to a driver following the motorcycle that the motorcycle is slowing down.

17 Claims, 14 Drawing Sheets

ADVANCED WARNING LIGHTING SYSTEMS AND METHODS

CROSS-REFERENCE TO RELATED APPLICATION

This application claims priority to and is a continuation-in-part of U.S. patent application Ser. No. 16/046,625 entitled Advanced Warning Lighting Systems and Methods and filed on Jul. 26, 2018, which is incorporated herein by referenced.

BACKGROUND

Driving on the road can be hazardous for many reasons. In one scenario, it is oftentimes difficult when driving behind a vehicle to know whether the vehicle is slowing down. Indeed, when a driver of the vehicle applies pressure to a brake in the vehicle, braking lights illuminate on the back of the vehicle.

However, prior to the driver applying pressure to the brake, there is no warning that a vehicle may be slowing down or that the brake may be applied soon. In this regard, a driver of the vehicle may decrease the speed of the vehicle by simply letting up on the accelerator. In such a scenario, there is presently no lighting system that makes the driver(s) behind the vehicle aware that the vehicle may be slowing down despite that no pressure is being applied to the brake. An Advanced Signal Warning Device (ASWD) light provides the rearward driver(s) an indication that the driver of the vehicle ahead may apply the brake and therefore increasing roadway safety by making drivers aware.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure describes an embodiment of an advanced signal warning device (ASWD) system for vehicles. The ASWD comprises lights or arrays of lights that can be activated when a vehicle is slowing down. The ASWD system operates using the controller area network (CAN) bus of a vehicle and can be either built into the vehicle's operating system or it can be an after-market kit that is installed on the vehicle.

In either embodiment, information is obtained from the CAN bus of the vehicle to determine at least that pressure has been let off the accelerator. Other parameters may be analyzed as well. For example, the speed of the vehicle may be monitored, and the transmission selector may be monitored. In one embodiment, if the vehicle speed is greater than 20 miles per hour, the throttle position is less than a percentage, e.g., 3%, and a brake switch is off, this may signal the system to light the advanced warning lighting system. Other parameters that may be monitored include the distance of a nearest forward vehicle, speed of a nearest forward vehicle, and lighting of a brake light of the nearest forward vehicle. Also, the system may monitor the distance of the nearest forward vehicle and the closure rate with the nearest forward vehicle. Each of these parameters may be used to determine whether the ASWD system should be activated.

In one embodiment, the vehicle may comprise a self-driving system. In such an embodiment, the self-driving system may determine at least that pressure has been let off the accelerator. Other parameters may be monitored as well. When the self-driving system determines that the vehicle is slowing down due to pressure being let off of the accelerator, the self-driving system can activate the ASWD system.

Figure 1:
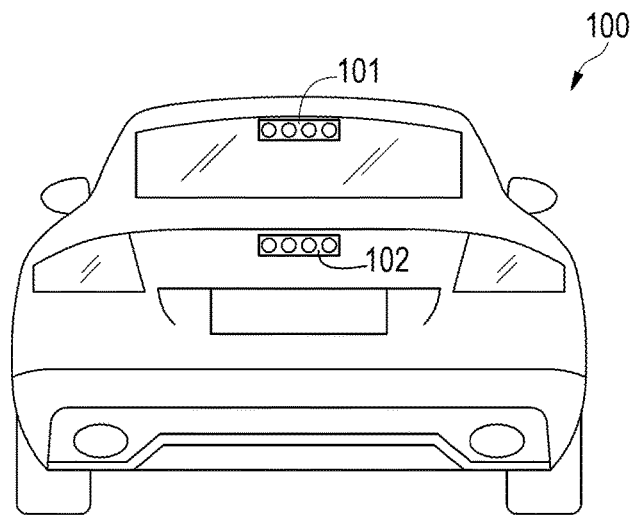
FIG. 1 depicts a car having an advanced signal warning light in accordance with an embodiment of the present disclosure.

FIGS. 1-4B depict vehicles and exemplary positions of advanced warning lights. In this regard, FIG. 1 depicts a car 100. The car 100 may have an advanced warning light that is an array of lights 101 that is used as a brake light, for example, and this array of lights 101 may be an array of light emitting diodes (LEDs). As shown this array of lights 101 may be positioned at the top of the rear window or it may have array of lights 101 on the back end of the vehicle, e.g., on the trunk. Of this array of lights 101 at least one of the LEDs in the array of lights 101 is used as an advanced warning light. This advanced warning light will activate when the vehicle slows down, which is described further herein.

Figure 2:
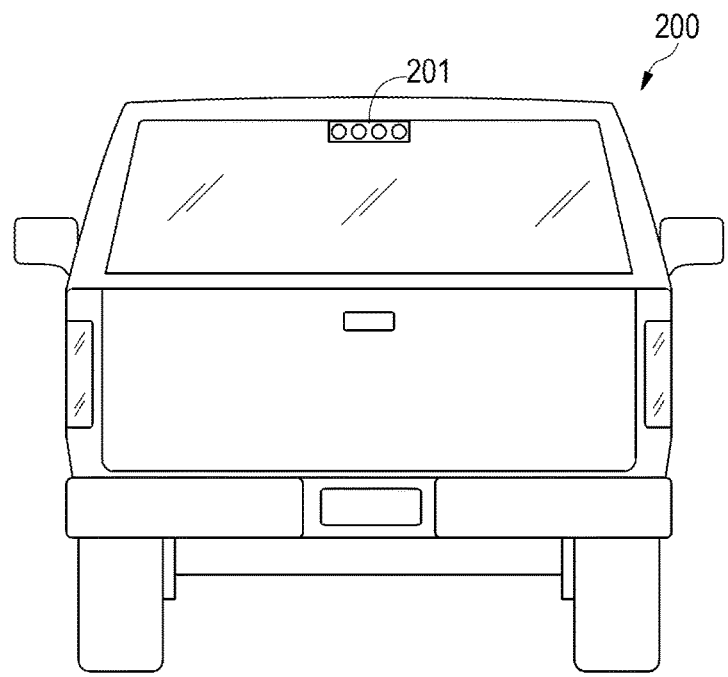
FIG. 2 depicts a truck having an advanced signal warning light in accordance with an embodiment of the present disclosure.

FIG. 2 depicts a sports utility vehicle (SUV) 200. The SUV 200 has an advanced warning light that may be an array of lights 201 that is used as a brake light, for example, and this array of lights 201 may be an array of LEDs. As shown, the array of lights 201 may be positioned at the top of the rear window. Note that the array of lights 201 may be at other positions on the SUV 200 in other embodiments, e.g., on the bumper. Of this array of lights 201 at least one of the LEDs in the array of lights 201 is used as an advanced warning light. This advanced warning light will activate when the vehicle slows down, which is described further herein.

Figure 3:
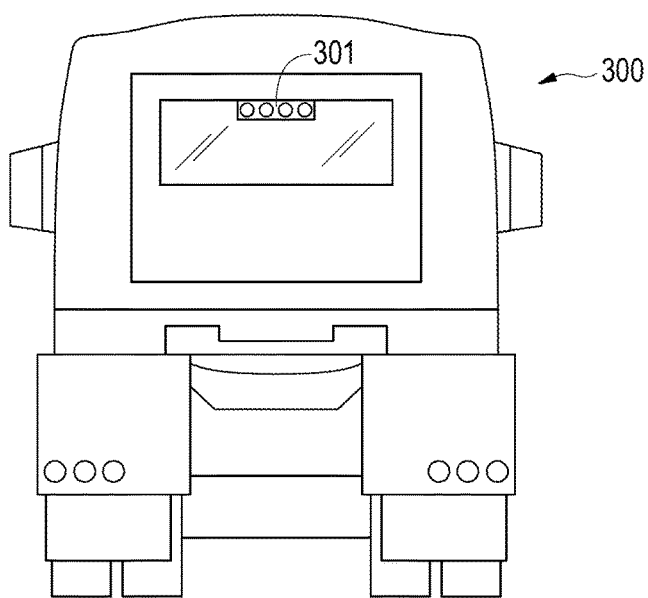
FIG. 3 depicts a tractor trailer cab having an advanced signal warning light in accordance with an embodiment of the present disclosure.

FIG. 3 depicts a truck cab 300 without a trailer installed thereon. The truck cab 300 has an advanced warning light that is an array of lights 301 that is used as a brake light, for example, and this array of lights 101 may be an array of LEDs. As shown, this array of lights 301 may be positioned at the top of the rear window. In other embodiments, the truck cab 300 may have a wind deflector installed on the top of the cab. In such an embodiment, the array of lights 301 may be installed on the wind deflector. Of this array of lights 301 at least one of the LEDs in the array of lights 301 is used as an advanced warning light. This advanced warning light will activate when the vehicle slows down, which is described further herein.

Figure 4B:
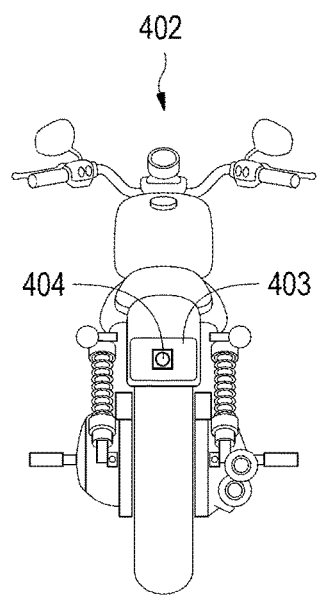
FIG. 4B depicts a motorcycle having an advanced signal warning light in accordance with an embodiment of the present disclosure.
Figure 4A:
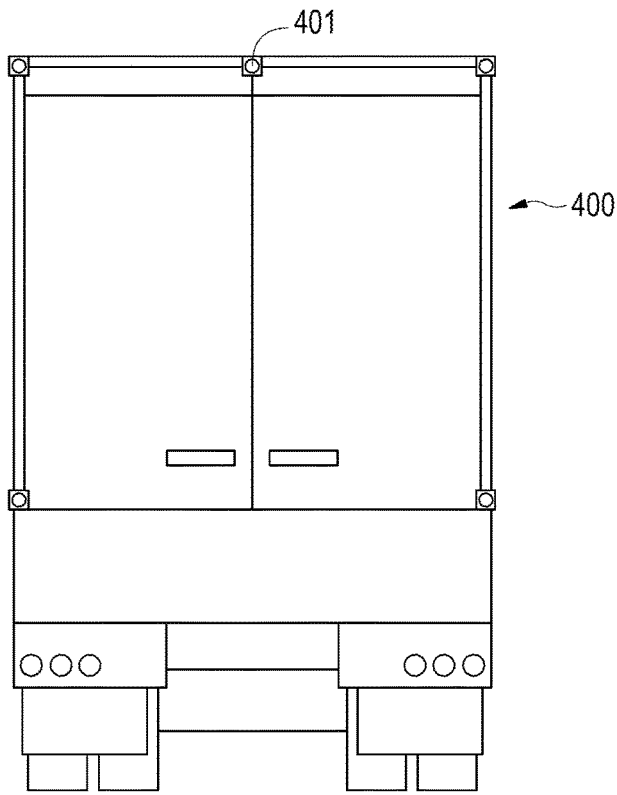
FIG. 4A depicts a tractor trailer having an advanced signal warning light in accordance with an embodiment of the present disclosure.

FIG. 4A depicts a tractor trailer 400 with the trailer installed thereon. In such an embodiment, the tractor trailer 400 may have an advanced warning light 401 installed on the back of the trailer at the top of the trailer. Note that the advanced warning light may be installed at other positions on the back of the tractor trailer 400 in other embodiments.

FIG. 4B depicts a motorcycle 402. The motorcycle 402 comprises a brake light 403. In an embodiment of the present disclosure, an advanced warning light 404 is installed in the center of the brake light 403. Note that the advanced warning light 404 may be installed in other positions relative to the brake light 403 in other embodiments.

Figure 4C:
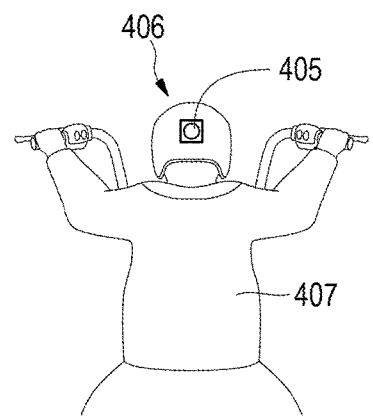
FIG. 4C depict a rider on a motorcycle and an advanced signal warning light on a helmet worn by the rider in accordance with an embodiment of the present disclosure.

FIG. 4C depicts a rider 407 of the motorcycle 402 (FIG. 4B). In the embodiment depicted, the rider 407 wears a helmet 406. Centered on the back of the helmet 406 is an advanced warning light 405. The advanced warning light 405 may be electrically coupled to a printed circuit board (not shown) mounted on an inside wall of the helmet 406. In such an embodiment, the printed circuit board may comprise a transceiver for receiving signals, e.g., a signal when the brake is depressed. When such a signal is received, the printed circuit board activates the advanced warning light 405. In another embodiment, the printed circuit board may be hard-wired to an interface of the CAN bus. In such an embodiment, the printed circuit board may receive a signal, e.g., a signal when the brake is depressed. When a signal is received, the printed circuit board activates the advanced warning light 405.

Figure 4D:
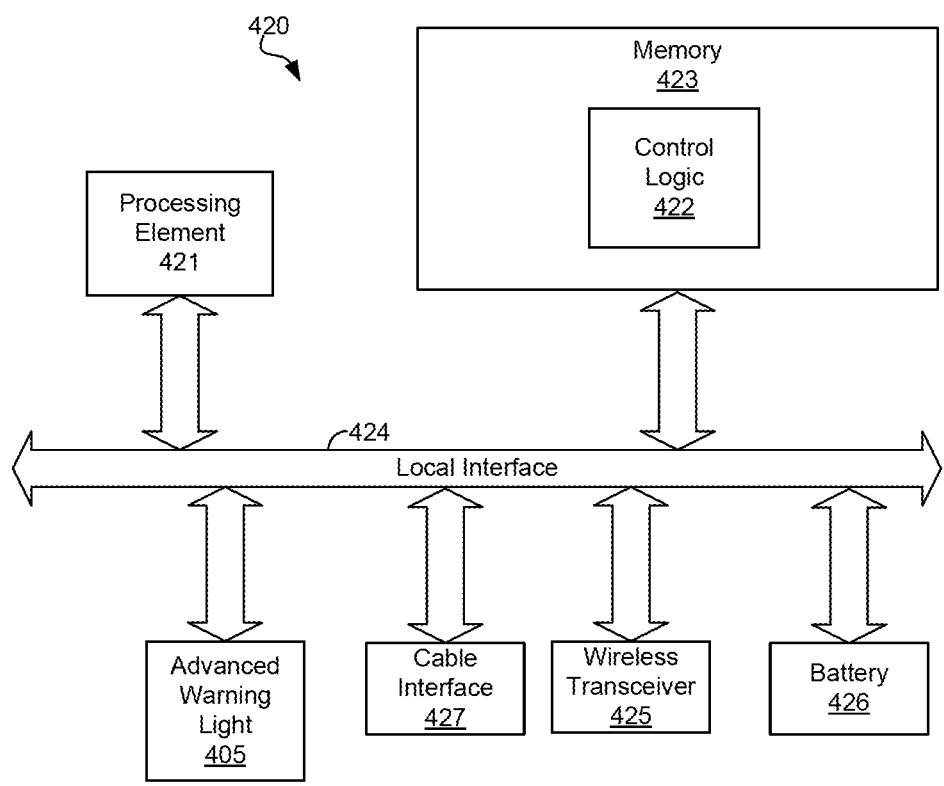
FIG. 4D is a block diagram of a printed circuit board (PCB) that may be used in the helmet such as is depicted in FIG. 4C.

FIG. 4D is a block diagram of an exemplary printed circuit board (PCB) 420 that may be used in the helmet 406 (FIG. 4C). The PCB 420 comprises a processing element 421, memory 423, the advanced warning light 405, a wireless transceiver 425, and a battery 426. Stored in memory 423 is control logic 422. In an alternative embodiment, the PCB 420 may comprise a cable interface 427.

The control logic 422 controls the functionality of the PCB 420, as will be described in more detail hereafter. It should be noted that the control logic 422 can be implemented in software, hardware, firmware or any combination thereof. In an exemplary embodiment illustrated in FIG. 4D, the control logic 422 is implemented in software and stored in memory 423.

Note that the control logic 422, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the PCB 420 depicted by FIG. 4D comprises at least one conventional processing element 421, such as a digital signal processor (DSP) or a central processing unit (CPU) that communicates to and drives the other elements within the PCB 420 via a local interface 424, which can include at least one bus. Further, the processing element 421 is configured to execute instructions of software, such as the control logic 422.

The battery 426 is any type of battery known in the art or future-developed for providing power to the PCB 420. Note that in one embodiment the battery 426 is a rechargeable battery.

Furthermore, the wireless transceiver is any type of device configured for receiving and/or transmitting radio signals. As mere examples, the wireless transceiver 425 may be a fiber-store small form-factor (SFP), an enhanced small form-factor pluggable (SFP+), or a 10 Gigabit small form-factor pluggable module (XFP). In one embodiment, the transceivers are Bluetooth® transceivers and communicate using Bluetooth® protocol.

In operation, the PCB 420 receives signals via the wireless transceiver 425. As will be described further herein, these signals originate with the CAN bus of the motorcycle 402 (FIG. 4B). Upon receipt of signals, the control logic 422 determines whether to activate the advanced warning light 405 or deactivate the advanced warning light 405. In this regard, the signal received indicates whether to activate the advanced warning light 405 or deactivate the advanced warning light 405. In response to the type of signal received, the control logic 422 either transmits a signal to the advanced warning light 405 to turn on the advanced warning light 405 or transmits a signal to the advanced warning light 405 to turn off the advanced warning light 405.

Figure 4E:
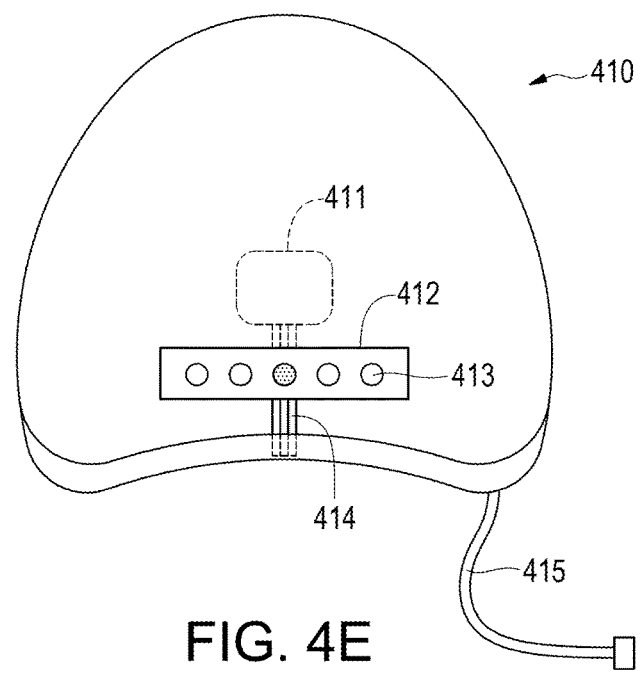
FIG. 4E depicts another helmet in accordance with another embodiment of the present disclosure and having an array of light emitting diodes (LEDs) mounted on an outside surface of the helmet.

FIG. 4E depicts another embodiment of a helmet 410 in accordance with the present disclosure. The helmet 410 comprises a PCB 411 and an advanced warning light 412 that comprises a plurality of lights 413. In the embodiment, the advanced warning light 412 comprises an adhesive strip such that the adhesive strip couples the advanced warning light 412 to the outside surface of the helmet.

The PCB 411 is electrically coupled to the advanced warning light 412 via an electrical cable 414 that traverses from the advanced warning light 412 downward and under a trim of the helmet 410 to the PCB 411. Further, the helmet 410 may comprise a cable 415. In one embodiment, the cable 415 may provide power to the PCB 411, which in turn provides power to the advanced warning light 412. In another embodiment, the cable 415 may be coupled to the CAN bus of the motorcycle 402 (FIG. 4B), and the cable 415 delivers signals to the PCB 411, which is described further herein.

Figure 4G:
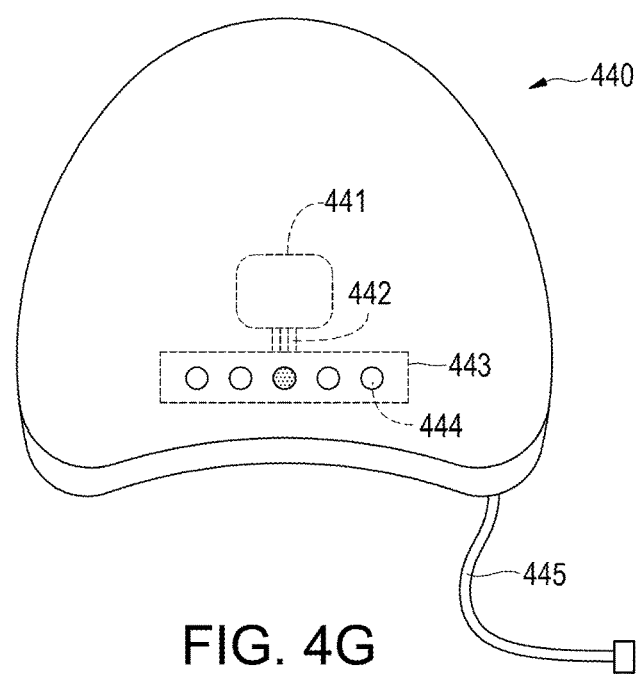
FIG. 4G depicts another helmet in accordance with another embodiment of the present disclosure and having an array of LEDs mounted on a PCB wherein the PCB is attached to an inside surface of the helmet and the LEDs projecting through holes in the wall of the helmet.
Figure 4F:
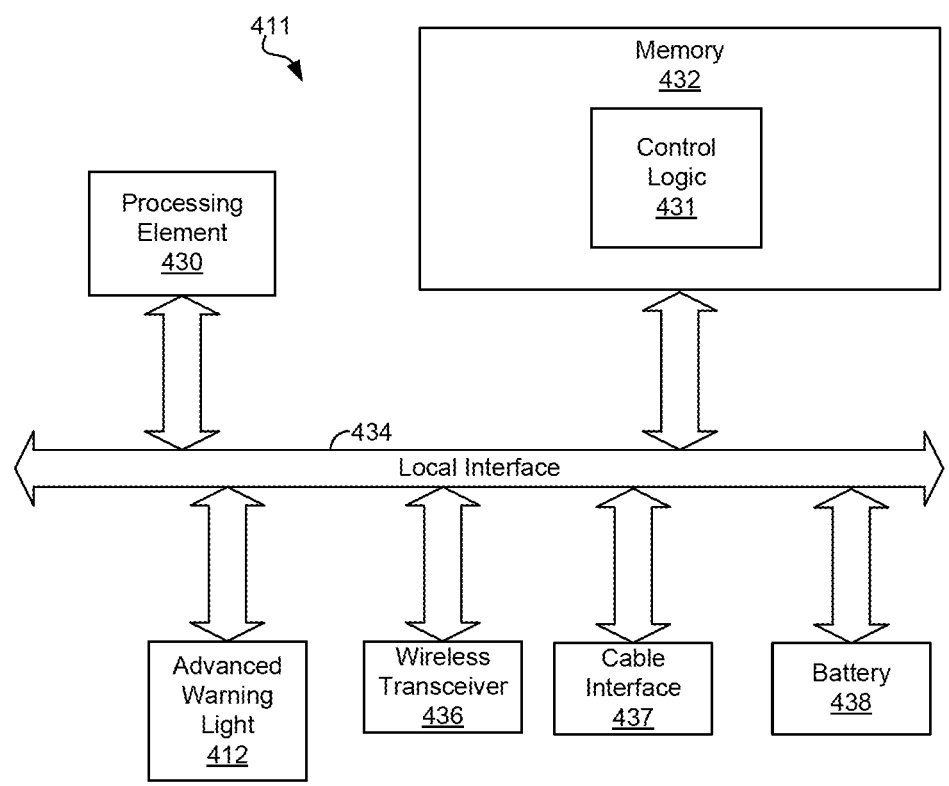
FIG. 4F is a block diagram of a PCB that may be used in the helmet such as is depicted in FIG. 4E.

FIG. 4F is a block diagram of an exemplary printed circuit board (PCB) 411 that may be used in the helmet 410 (FIG. 4E). The PCB 411 comprises a processing element 430, memory 432, the advanced warning light 412, a wireless transceiver 436, and a battery 438. Stored in memory 432 is control logic 431. In an alternative embodiment, the PCB 411 may comprise a cable interface 437.

The control logic 431 controls the functionality of the PCB 411, as will be described in more detail hereafter. It should be noted that the control logic 411 can be implemented in software, hardware, firmware or any combination thereof. In an exemplary embodiment illustrated in FIG. 4F, the control logic 411 is implemented in software and stored in memory 432.

Note that the control logic 431, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the PCB 411 depicted by FIG. 4F comprises at least one conventional processing element 430, such as a digital signal processor (DSP) or a central processing unit (CPU) that communicates to and drives the other elements within the PCB 411 via a local interface 434, which can include at least one bus. Further, the processing element 430 is configured to execute instructions of software, such as the control logic 431.

The battery 438 is any type of battery known in the art or future-developed for providing power to the PCB 411. Note that in one embodiment the battery 438 is a rechargeable battery.

The cable interface 437 couples to the cable 415 (FIG. 4E). Note that the cable 415 may deliver power to the PCB 411 in one embodiment. In another embodiment, the cable may deliver control signals to the PCB 411. In this regard, in operation, the cable 415 may be coupled directly or indirectly to the CAN bus of the motorcycle 402 (FIG. 4B). Thus, when a rider decelerates or applies pressure to the brakes, the cable 415 may deliver a signal indicating such. In response, the control logic 431 transmits a signal to the advanced warning light 412 that activates the LEDs 413 to provide advanced warning to a follower of the vehicle that the vehicle is slowing down. Further, the signal received may indicate that the rider is no longer decelerating. In such a scenario, the control logic 431 receives the signal then transmits a signal to the advanced warning light 412 that deactivate the LEDs 413.

Furthermore, the wireless transceiver 436 is any type of device configured for receiving and/or transmitting radio signals. As mere examples, the wireless transceiver 436 may be a fiber-store small form-factor (SFP), an enhanced small form-factor pluggable (SFP+), or a 10 Gigabit small form-factor pluggable module (XFP). In one embodiment, the transceivers are Bluetooth® transceivers and communicate using Bluetooth® protocol.

In operation, the PCB 411 receives signals via the wireless transceiver 436. As will be described further herein, these signals originate with the CAN bus of the motorcycle 402 (FIG. 4B). Upon receipt of signals, the control logic 431 determines whether to activate the advanced warning light 412 or deactivate the advanced warning light 412. In this regard, the signal received indicates whether to activate the advanced warning light 412 or deactivate the advanced warning light 412. In response to the type of signal received, the control logic 431 either transmits a signal to the advanced warning light 412 to turn on the LEDs 413 or transmits a signal to the advanced warning light 412 to turn off the LEDs 413.

FIG. 4G depicts another embodiment of a helmet 440 in accordance with the present disclosure. The helmet 440 comprises a PCB 441 mounted on an inside surface of the helmet 440. The helmet also comprises an advanced warning light 443 that comprises a plurality of lights 444. In the embodiment, the advanced warning light 443 is coupled to a strip that is coupled to the inside surface of the helmet 440. In the embodiment, there are openings in the back of the helmet through which the lights 444 protrude.

The PCB 441 is electrically coupled to the advanced warning light 412 via an electrical cable 442 that that is coupled to the strip on which the LEDs 444 are mounted. Further, the helmet 410 may comprise a cable 445. In one embodiment, the cable 445 may provide power to the PCB 441, which in turn provides power to the advanced warning light 443. In another embodiment, the cable 445 may be coupled to the CAN bus of the motorcycle 402 (FIG. 4B), and the cable 445 delivers signals to the PCB 441, which is described further herein.

Figure 4H:
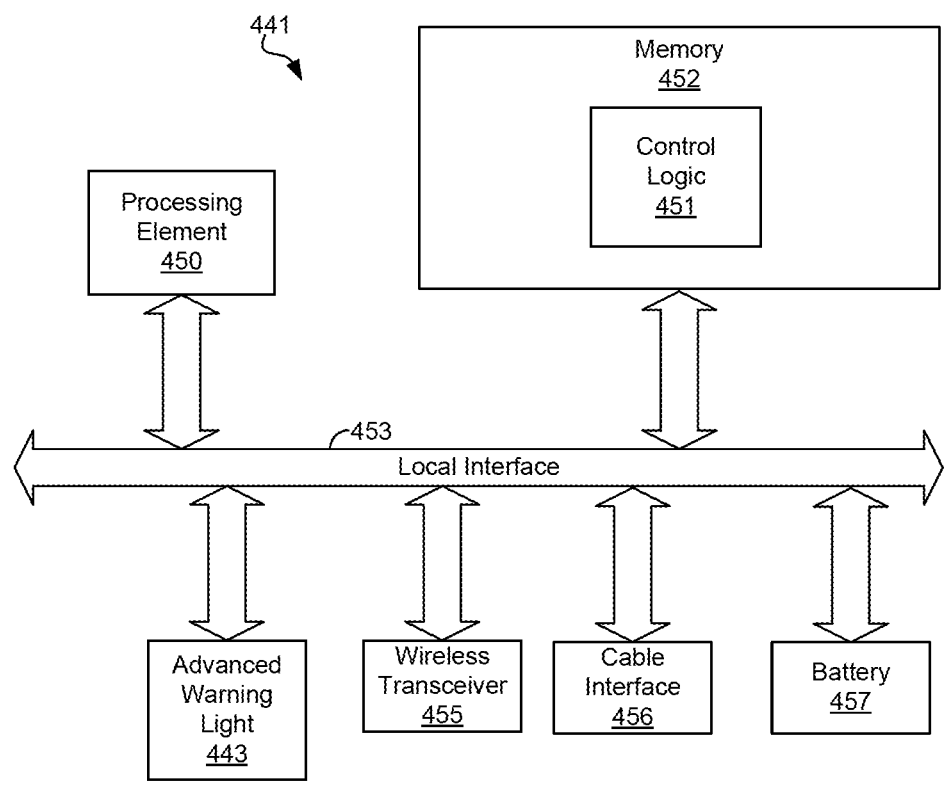
FIG. 4H is a block diagram of a PCB that is mounted on the inside surface of the helmet such as is depicted in FIG. 4G.

FIG. 4H is a block diagram of an exemplary printed circuit board (PCB) 441 that may be used in the helmet 440 (FIG. 4G). The PCB 441 comprises a processing element 450, memory 452, the advanced warning light 443, a wireless transceiver 455, and a battery 457. Stored in memory 452 is control logic 451. In an alternative embodiment, the PCB 441 may comprise a cable interface 437.

The control logic 451 controls the functionality of the PCB 441, as will be described in more detail hereafter. It should be noted that the control logic 451 can be implemented in software, hardware, firmware or any combination thereof. In an exemplary embodiment illustrated in FIG. 4H, the control logic 451 is implemented in software and stored in memory 452.

Note that the control logic 451, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the PCB 441 depicted by FIG. 4H comprises at least one conventional processing element 450, such as a digital signal processor (DSP) or a central processing unit (CPU) that communicates to and drives the other elements within the PCB 441 via a local interface 453, which can include at least one bus. Further, the processing element 450 is configured to execute instructions of software, such as the control logic 451.

The battery 457 is any type of battery known in the art or future-developed for providing power to the PCB 441. Note that in one embodiment the battery 457 is a rechargeable battery.

The cable interface 456 couples to the cable 445 (FIG. 4G). Note that the cable 445 may deliver power to the PCB 441 in one embodiment. In another embodiment, the cable 445 may deliver control signals to the PCB 441. In this regard, in operation, the cable 445 may be coupled to directly or indirectly to the CAN bus of the motorcycle 402 (FIG. 4B). Thus, when a rider decelerates or applies pressure to the brakes, the cable 445 may deliver a signal indicating such. In response, the control logic 451 transmits a signal to the advanced warning light 443 that activates the LEDs 444 to provide advanced warning to a follower of the vehicle that the vehicle is slowing down. Further, the signal received may indicate that the rider is no longer decelerating. In such a scenario, the control logic 451 receives the signal then transmits a signal to the advanced warning light 443 that deactivate the LEDs 444.

Furthermore, the wireless transceiver 455 is any type of device configured for receiving and/or transmitting radio signals. As mere examples, the wireless transceiver 455 may be a fiber-store small form-factor (SFP), an enhanced small form-factor pluggable (SFP+), or a 10 Gigabit small form-factor pluggable module (XFP). In one embodiment, the transceivers are Bluetooth® transceivers and communicate using Bluetooth® protocol.

In operation, the PCB 441 receives signals via the wireless transceiver 455. As will be described further herein, these signals originate with the CAN bus of the motorcycle 402 (FIG. 4B). Upon receipt of signals, the control logic 451 determines whether to activate the advanced warning light 443 or deactivate the advanced warning light 443. In this regard, the signal received indicates whether to activate the advanced warning light 443 or deactivate the advanced warning light 443. In response to the type of signal received, the control logic 451 either transmits a signal to the advanced warning light 443 to turn on the LEDs 444 or transmits a signal to the advanced warning light 443 to turn off the LEDs 444.

With reference to FIGS. 1-4H, in operation, the advanced warning lighting system monitors the CAN bus. When it appears from parameters being monitored that the vehicle is slowing down, e.g., the throttle is released, at least one of the lights in the advanced warning lights 101 (FIG. 1), 102 (FIG. 1), 201 (FIG. 2), 301 (FIG. 3), 412 (FIG. 4E), 443 (FIG. 4G), light 401 (FIG. 4A) and light 405 (FIG. 4C) will activate signaling to the driver behind the vehicle that the vehicle is slowing down. The lights alert the driver of the following vehicle that the driver of the vehicle is slowing down.

In one embodiment, the advanced warning lights that are arrays of lights 101, 102, 201, 412, 443, and 301, and light 401 and light 405, may be light emitting diodes. They may emit any color of light that would be visible to a driver following the vehicles. As an example, the lights may be yellow or orange. This example is not to be limiting in the present disclosure.

In this regard, the advanced warning lights 101, 102, 201, 412, 443, and 301, and advanced warning light 401 and advanced warning light 404 can reduce rear end collisions. In this matter, the advanced warning lights in the array of lights 101, 102, 201, 412, 443 and 301, advanced warning light 401, and advanced warning light 404 can promote safer roadways, save lives, reduce injuries, reduce medicinal claim costs, reduce property claim costs, reduce costly vehicle repairs, and save insurance companies payouts. As a result, insurance companies may become more competitive by increasing profit margins, and the savings can be passed on to insurance company carriers and the insured.

Note that the advanced warning lights may be integral with existing lights on the vehicles. In this regard, one of the lights of the existing brake lighting systems may be replaced with a light of a different color, e.g., yellow. Thus, when a driver following a vehicle sees the yellow light activate, this signals the driver that the vehicle that he/she is following is slowing down. With the advanced warning lights, the driver can then take appropriate measures to avoid colliding with the vehicle in front of them that is slowing down. Note that as soon as the driver of this vehicle hits his/her brake, the advanced warning lights will deactivate, and the brake lights will activate. This indicates to the driver behind the vehicle that the vehicle is slowing down more rapidly or even stopping.

Note that in one embodiment shown in FIG. 4B, the vehicle is the motorcycle 402. In such an embodiment, the motorcycle has an advanced warning light 404 on the back of the motorcycle integrated within the brake light 403 that is illuminated to indicate that the motorcycle is slowing down. Additionally, an advanced warning light may be integrated into a motorcycle driver's helmet, and the advanced warning light may be illuminated to indicate that the motorcycle is slowing down.

Further note that there are at least two ways of implementing the above-described systems in a vehicle. The system may be implemented by an original equipment manufacturer (OEM). In another embodiment, the system may be implemented by a kit that is installed after market.

Note that as described only one of the lights in the array of lights 101, 201, 301, 412, and 443 may be activated in response to the vehicle slowing down. In other embodiments, more than one light may be activated.

Figure 5:
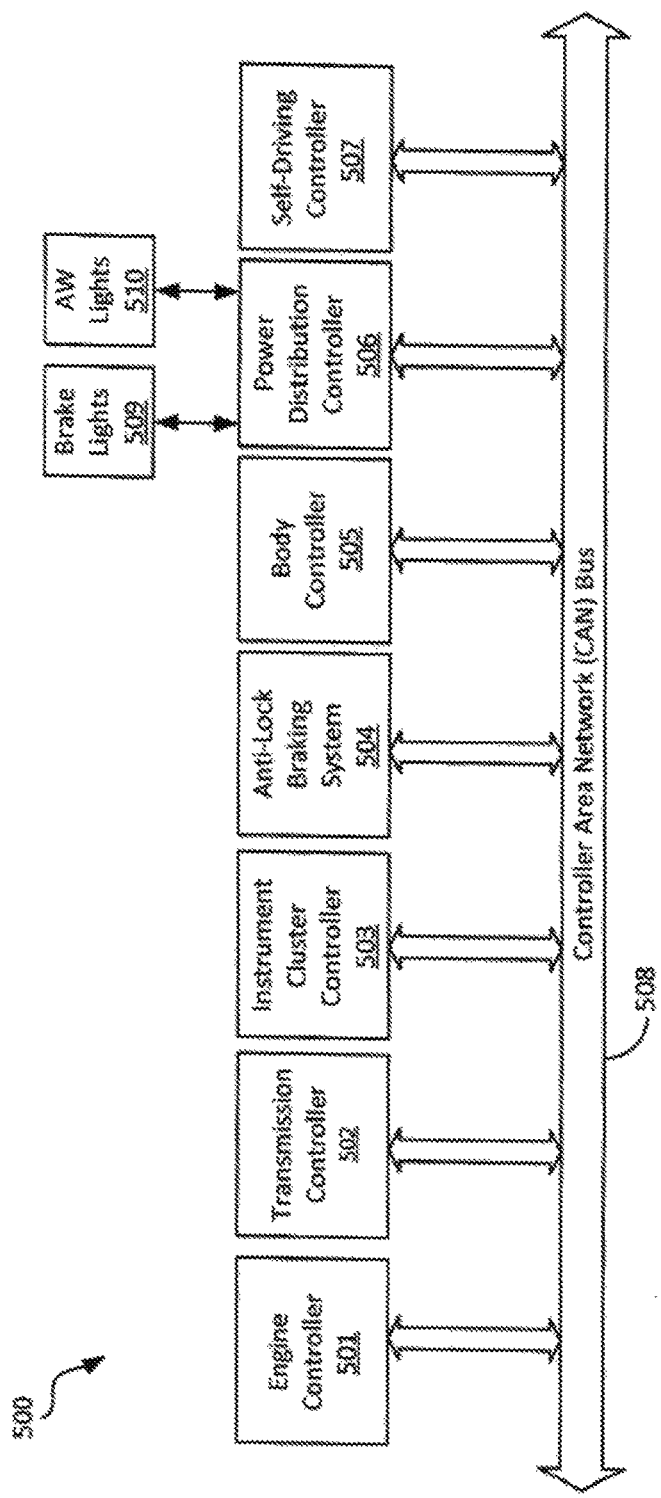
FIG. 5 is a block diagram of an advanced warning light system in accordance with an embodiment of the present disclosure that is installed as an original equipment manufacturer.

FIG. 5 is an advanced warning lighting system 500 in a vehicle in accordance with an embodiment of the present disclosure when installed by an OEM. The system 500 comprises an engine controller 501, a transmission controller 502, an instrument cluster 503, and anti-lock braking system 504, a body controller 505, a power distribution controller 506, and a self-driving processor 507. Each of these controllers communicates with different sensors and components of the vehicle, and each of these controllers communicates over the CAN bus 508.

In operation, the engine controller 501 may monitor various aspects of the vehicle in which the system 500 is installed. In this regard, the engine controller 501 may monitor the manifold (not shown), vacuum pressure in the engine, throttle position, engine speed, brake position, and vehicle speed. These parameters are merely exemplary, and other parameters may be monitored in other embodiments. Note that other vehicles may have different controllers depending upon which systems and options are installed. As the various parameters are monitored, the controllers 501-507 transmit messages on the CAN bus 508 about the parameters being monitored. For example, if the throttle position sensor indicates that pressure on the accelerator has been released, the engine controller 501 transmits a message on the CAN bus 508 that pressure on the accelerator has been released.

In operation, the transmission controller 502 also monitors various parameters. For example, the transmission controller 502 may monitor the drive gear and its current position. In operation, if the drive gear changes positions, the transmission controller 502 transmits a message on the CAN bus 508 that the drive gear has changed positions.

The instrument cluster controller 503 controls information exchange between the vehicle and the driver. In this regard, the instrument cluster controller 503 receives input from instruments and displays data indicative of the input to the driver. In one embodiment, the instrument cluster controller 503 may monitor the speed of the vehicle. In such a scenario, the instrument cluster controller 503 may transmit a message on the CAN bus indicating the speed of the vehicle.

The anti-lock braking system (ABS) 504 is a system that controls braking of the vehicle and transmits a message indicating whether the brake is applied or not applied on the CAN bus 508. In this regard, the ABS monitors wheel speed sensors to determine if one or more wheels are trying to lock up during braking. If a wheel tries to lock up, a series of hydraulic valves limit or reduce the braking on that wheel. This prevents skidding and allows a driver to maintain steering control. In operation, the ABS system 504 may transmit messages on the CAN bus 508 related to such activities.

The body controller 505 is typically responsible for monitoring and controlling various electronic accessories in a vehicle's body. Typically in a vehicle the body controller 505 controls the power windows, power mirrors, air conditioning, immobilizer system, central locking, etc. The body controller 505 communicates with other on-board controllers via the CAN bus 508, and its main application is controlling load drivers—actuating relays that in turn perform actions in the vehicle such as locking the doors or dimming the salon overhead lamp.

The power distribution controller 506 controls power from the vehicle's battery to the several electrical devices on the car. In the present disclosure, at interest, is power that is provided to the brake lights 509 and the advanced warning lights 510 in a vehicle.

The self-driving controller 507 creates and maintains an internal map of the vehicle's surroundings, based on a wide array of sensors, e.g., radar. The self-driving controller 507 processes inputs from the sensors, plots a path, and sends instructions to the vehicle's "actuators," which control acceleration, braking, and steering. Hard-coded rules, obstacle avoidance algorithms, predictive modeling, and "smart" object discrimination (i.e., knowing the difference between a bicycle and a motorcycle) help the software follow traffic rules and navigate obstacles.

In operation, the power distribution controller 506 is configured to receive messages on the CAN bus 508. The power distribution controller 506 analyzes the messages received to determine whether to send power to the advanced warning lights 510. In this regard, different algorithms can be used to determine when advanced warning lights should be illuminated. At a foundational level, if the power distribution controller 506 receives a message that pressure on the throttle has been alleviated, the power distribution controller 506 supplies power to the advanced warning lights 510. As mere examples, the driver may take his/her foot off the acceleration pedal or the driver may select to decrease speed when using cruise control buttons on the user's vehicle. Other algorithms may be used in other embodiments.

As mere examples, the following algorithms may be used. For example, if the transmission selector is in drive, the vehicle speed is greater than 20 miles per hour, the throttle position is less than three percent (3%), and the brake light is off, the power distribution controller 506 may activate the advanced warning light. If all the conditions are not met, the power distribution controller 506 sets the warning light off.

In another embodiment, the system 500 may used forward vision as provided by the self-driving controller 507. In such an embodiment, if the nearest forward vehicle distance is less than fifty (50) feet, the nearest forward vehicle speed is greater than thirty (30) miles per hour, the nearest forward vehicle brake light is on, and the brake switch is off, the power distribution controller 506 may activate the advanced warning light. If all the conditions are not met, the power distribution controller 506 sets the warning light off.

In still another embodiment, the system may again use the forward vision as provided by the self-driving controller 507. In such an embodiment, if the nearest forward vehicle distance is less than one hundred (100) feet, the nearest forward vehicle closure rate is greater than twenty (20) miles per hour, and the brake is off, the power distribution controller 506 may activate the advanced warning light. If all the conditions are not met, the power distribution controller 506 sets the warning light off.

Furthermore, if at any time the driver of the vehicle applies pressure to the brake, the engine controller 501 sends a message that pressure has been applied to the brake. The power distribution controller 506 receives the message over the CAN bus 508, turns off the advanced warning light 510, and turns on the brake lights 509.

Figure 6:
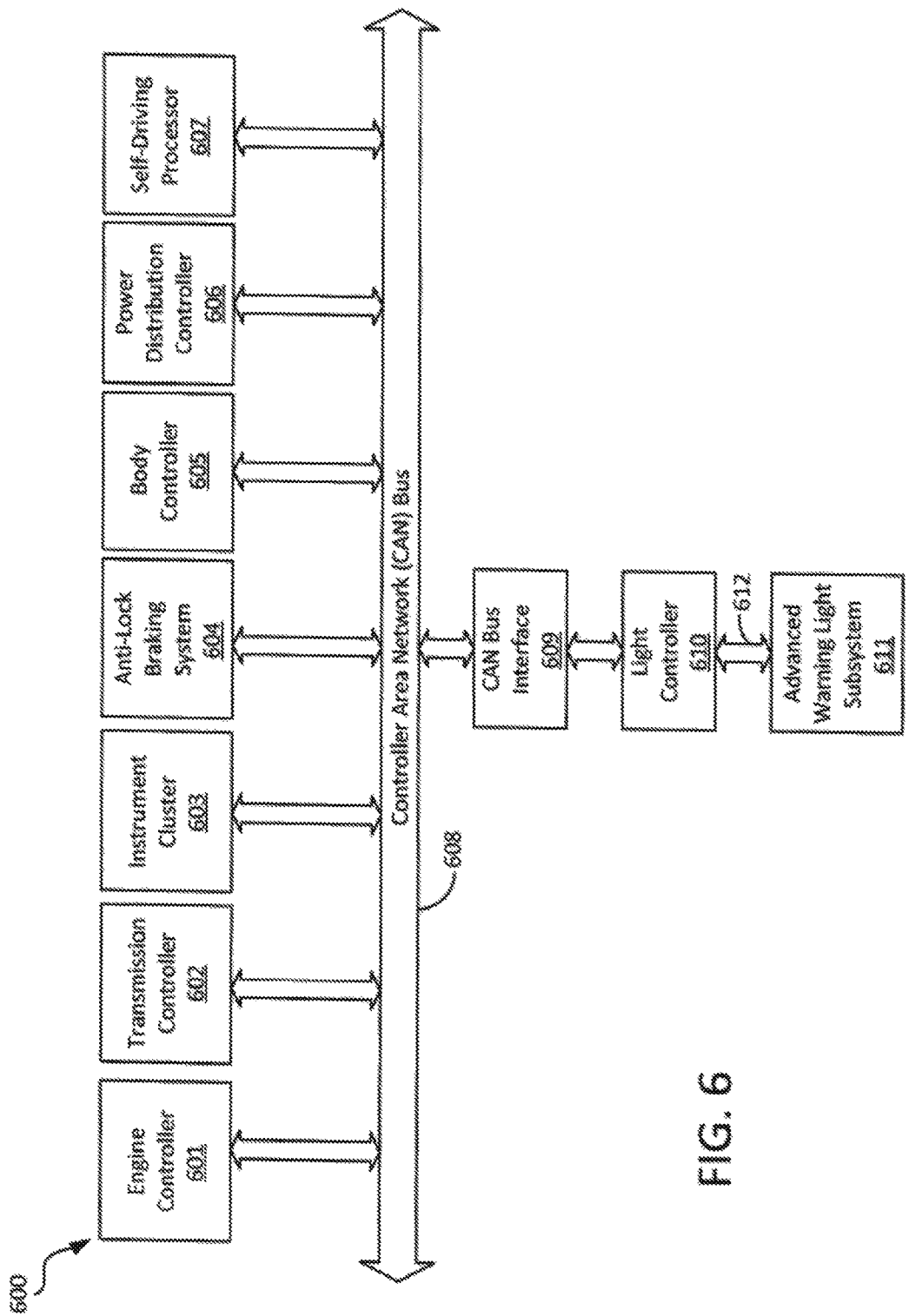
FIG. 6 is a block diagram of an advanced warning light system in accordance with an embodiment of the present disclosure that is installed as an after-market kit.

FIG. 6 is another embodiment of an advanced warning lighting system 600 in a vehicle in accordance with an embodiment of the present disclosure when installed after market as a kit. In such an embodiment, the vehicle comprises the main controllers as described with reference to FIG. 5. In this regard, the vehicle comprises an engine controller 601, a transmission controller 602, an instrument cluster 603, and ABS 604, a body controller 605, a power distribution controller 606, and a self-driving processor 607. As described above, each of these controllers 601-607 monitors certain parameters of the vehicle and transmits messages across the CAN bus 608 related to the parameters monitored.

In addition, the advanced warning lighting system 600 comprises a CAN bus interface 609, a light controller 610, and an advanced warning light subsystem 611. In operation, the CAN bus interface 609 receives messages from the controllers 601-607. The CAN bus interface 609 analyzes messages from the controllers 601-607 to determine if the advanced warning light should be illuminated. In one embodiment, if the CAN bus interface 609 receives a message that pressure has been alleviated from the throttle, this indicates that the advanced warning light should be illuminated.

The CAN bus interface transmits data indicative of a message to the light controller 610 indicting that the advanced warning light should be illuminated. In response, the light controller 610 transmits a signal to the advanced warning light subsystem 611, and the advanced warning light subsystem 611 illuminates the advanced warning light. In one embodiment, the connection 612 is a wireless connection; however, in another embodiment, the connection 612 is a wired connection. Each embodiment is described further herein.

Note that in one embodiment, the advanced warning light may be controlled by the existing power cable that lights the lighting implement. In such an embodiment, the light controller 610 may be configured to temporarily shut down power over the power cable. While the power is not being provided to the lighting implement, the light controller 610 may be configured for transmitting control signals to the advanced warning light subsystem 611 that illuminates the advanced warning light. In response, the lighting implement can be temporarily controlled by the advanced warning light subsystem 611, and the advanced warning light subsystem 611 may be configured for turning on and off the advanced warning light that indicates that the vehicle is slowing down, or the brake has been depressed.

Figure 7:
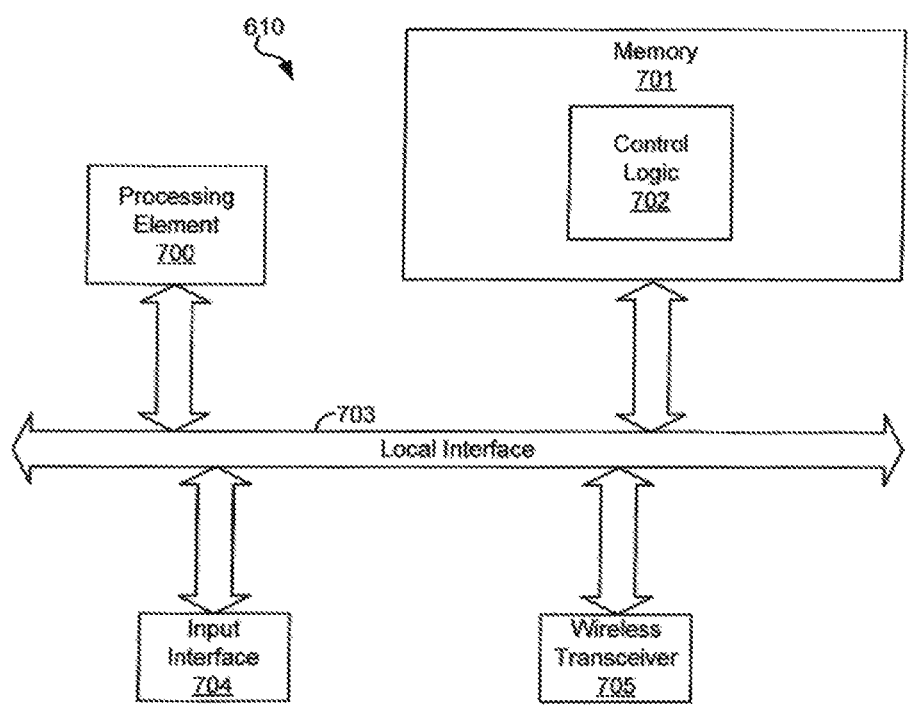
FIG. 7 is a block diagram of an exemplary light controller such as is depicted in FIG. 6 using wireless communication.

FIG. 7 is a block diagram depicting the light controller 610 in an embodiment where the connection 612 (FIG. 6) is a wireless connection. In such an embodiment, the light controller 610 comprises a processing element 700, memory 701, an input interface 704, and a wireless transceiver 705. Stored in memory 701 is control logic 702.

The control logic 702 controls the functionality of the light controller 610, as will be described in more detail hereafter. It should be noted that the control logic 702 can be implemented in software, hardware, firmware or any combination thereof. In an exemplary embodiment illustrated in FIG. 7, the control logic 702 is implemented in software and stored in memory 701.

Note that the control logic 702, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the light controller 610 depicted by FIG. 7 comprises at least one conventional processing element 700, such as a digital signal processor (DSP) or a central processing unit (CPU) that communicates to and drives the other elements within the light controller 610 via a local interface 703, which can include at least one bus. Further, the processing element 700 is configured to execute instructions of software, such as the control logic 702.

The input interface 704 is communicatively coupled to the CAN bus interface 609. The input interface 704 receives signals from the CAN bus interface 609 indicating whether the advanced warning light should be illuminated or whether the advanced warning light should be turned off. Additionally, the signal may indicate that the brakes have been applied.

The control logic 702 receives the signals via the input interface 704. In response to receipt of the signals, the control logic 702 determines what type of signal to send to the advanced warning light subsystem 611 via the wireless transceiver 705. In this regard, if the signal received via the input interface 704 indicates that the advanced warning light is to be turned on, the control logic 702 transmits data indicating that the advanced warning light is to be turned on. If the signal received via the input interface 704 indicates that the brakes have been applied, the control logic 702 transmits data to the advanced warning light subsystem indicating that the brake lights are to be turned on and the advanced warning light is to be turned off.

Figure 8:
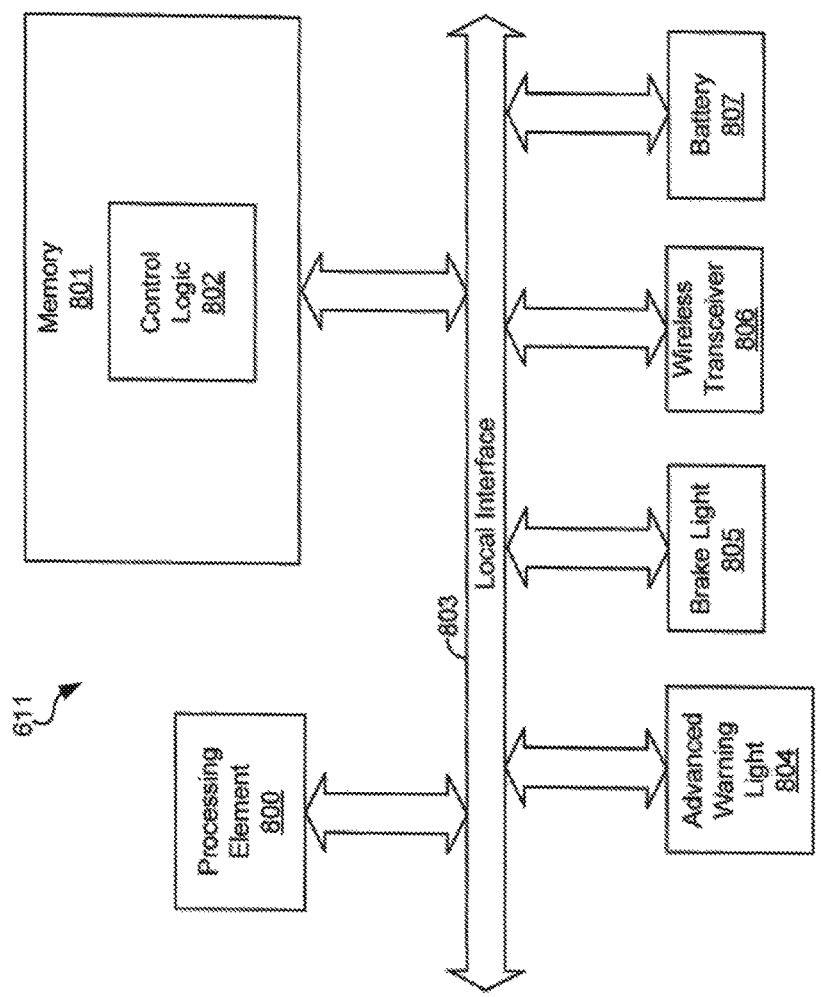
FIG. 8 is a block diagram of an exemplary advanced warning light subsystem such as is depicted in FIG. 6 using wireless communication.

FIG. 8 is a block diagram depicting the advanced warning light subsystem 611 in an embodiment where the connection 612 (FIG. 6) is a wireless connection. In such an embodiment, the advanced warning light subsystem 611 comprises a processing element 800, memory 801, an advanced warning light 804, a brake light 805, and a wireless transceiver 806. Stored in memory 801 is control logic 802.

The control logic 802 controls the functionality of the advanced warning light subsystem 611, as will be described in more detail hereafter. It should be noted that the control logic 802 can be implemented in software, hardware, firmware or any combination thereof. In an exemplary embodiment illustrated in FIG. 8, the control logic 802 is implemented in software and stored in memory 801.

Note that the control logic 802, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the advanced warning light subsystem 611 depicted by FIG. 8 comprises at least one conventional processing element 800, such as a digital signal processor (DSP) or a central processing unit (CPU) that communicates to and drives the other elements within the advanced warning light subsystem 611 via a local interface 803, which can include at least one bus. Further, the processing element 800 is configured to execute instructions of software, such as the control logic 802.

In operation, the advanced warning light subsystem 611 receives signals from the light controller 610 via the wireless transceiver 806. Upon receipt of signals from the light controller 610, the control logic 802 determines whether to activate the advanced warning light 804, deactivate the advanced warning light 804, or activate the brake light 805. In this regard, the signal received indicates whether to activate the advanced warning light 804, deactivate the advanced warning light 804, or activate the brake light 805. In response to the type of signal received, the control logic 802 either transmits a signal to the advanced warning light 804 to turn on the advanced warning light 804, transmits a signal to the advanced warning light 804 to turn off the advanced warning light 804, and/or transmits a signal to the brake light 805 to turn on the brake light 805.

Note that in the wireless embodiment of the present disclosure different types of transceivers may be used in different embodiments. In one embodiment, the transceivers are Bluetooth® transceivers and communicate using Bluetooth® protocol.

Figure 9:
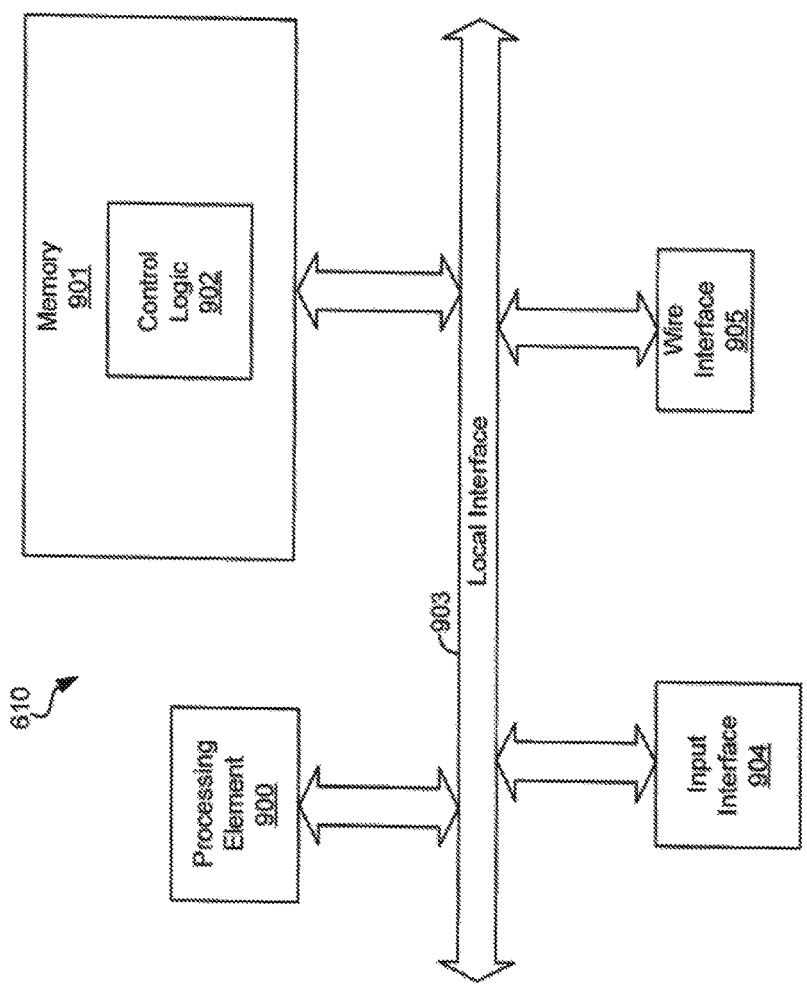
FIG. 9 is a block diagram of an exemplary light controller such as is depicted in FIG. 6 using wired communication.

FIG. 9 is a block diagram depicting the light controller 610 in an embodiment where the connection 612 (FIG. 6) is a wired connection. In such an embodiment, the light controller 610 comprises a processing element 900, memory 901, an input interface 904, and a wire interface 905. Stored in memory 901 is control logic 902.

The control logic 902 controls the functionality of the light controller 610, as will be described in more detail hereafter. It should be noted that the control logic 902 can be implemented in software, hardware, firmware or any combination thereof. In an exemplary embodiment illustrated in FIG. 9, the control logic 902 is implemented in software and stored in memory 901.

Note that the control logic 902, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the light controller 610 depicted by FIG. 9 comprises at least one conventional processing element 900, such as a digital signal processor (DSP) or a central processing unit (CPU) that communicates to and drives the other elements within the light controller 610 via a local interface 903, which can include at least one bus. Further, the processing element 900 is configured to execute instructions of software, such as the control logic 902.

The input interface 904 is communicatively coupled to the CAN bus interface 609. The input interface 904 receives signals from the CAN bus interface 609 indicating whether the advanced warning light should be illuminated or whether the advanced warning light should be turned off. Additionally, the signal may indicate that the brakes have been applied.

The control logic 902 receives the signals via the input interface 904. In response to receipt of the signals, the control logic 902 determines what type of signal to send to the advanced warning light subsystem 611 via a wire that couples the light controller 610 to the advanced warning light subsystem 611. In this regard, if the signal received via the input interface 904 indicates that the advanced warning light is to be turned on, the control logic 902 transmits data indicating that the advanced warning light is to be turned on. If the signal received via the input interface 904 indicates that the brakes have been applied, the control logic 902 transmits data to the advanced warning light subsystem 611 indicating that the brake lights are to be turned on and the advanced warning light is to be turned off.

Figure 10:
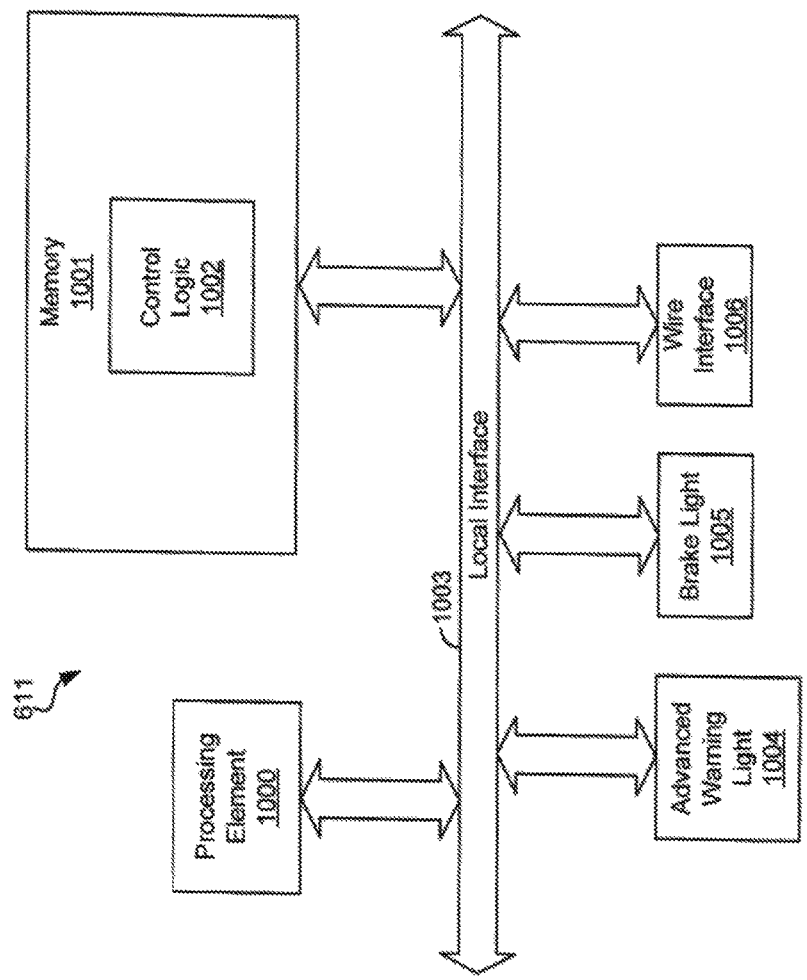
FIG. 10 is a block diagram of an exemplary advanced warning light subsystem such as is depicted in FIG. 6 using wired communication.

FIG. 10 is a block diagram depicting the advanced warning light subsystem 611 in an embodiment where the connection 612 (FIG. 6) is a wired connection. In such an embodiment, the advanced warning light subsystem 611 comprises a processing element 1000, memory 1001, an advanced warning light 1004, a brake light 1005, and a wire interface 1005. Stored in memory 1001 is control logic 1002.

The control logic 1002 controls the functionality of the advanced warning light subsystem 611, as will be described in more detail hereafter. It should be noted that the control logic 1002 can be implemented in software, hardware, firmware or any combination thereof. In an exemplary embodiment illustrated in FIG. 10, the control logic 1002 is implemented in software and stored in memory 1001.

Note that the control logic 1002, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the advanced warning light subsystem 611 depicted by FIG. 10 comprises at least one conventional processing element 1000, such as a digital signal processor (DSP) or a central processing unit (CPU) that communicates to and drives the other elements within the advanced warning light subsystem 611 via a local interface 1003, which can include at least one bus. Further, the processing element 1000 is configured to execute instructions of software, such as the control logic 1002.

In operation, the advanced warning light subsystem 611 receives signals from the light controller 610 via the wire interface 1006. Upon receipt of signals from the light controller 610, the control logic 1002 determines whether to activate the advanced warning light 1004, deactivate the advanced warning light 1004, or activate the brake light 1005. In this regard, the signal received indicates whether to activate the advanced warning light 1004, deactivate the advanced warning light 1004, or activate the brake light 1005. In response to the type of signal received, the control logic 1002 either transmits a signal to the advanced warning light 1004 to turn on the advanced warning light 1004, transmits a signal to the advanced warning light 1004 to turn off the advanced warning light 1004, and/or transmits a signal to the brake light 1005 to turn on the brake light 1005.

Figure 11:
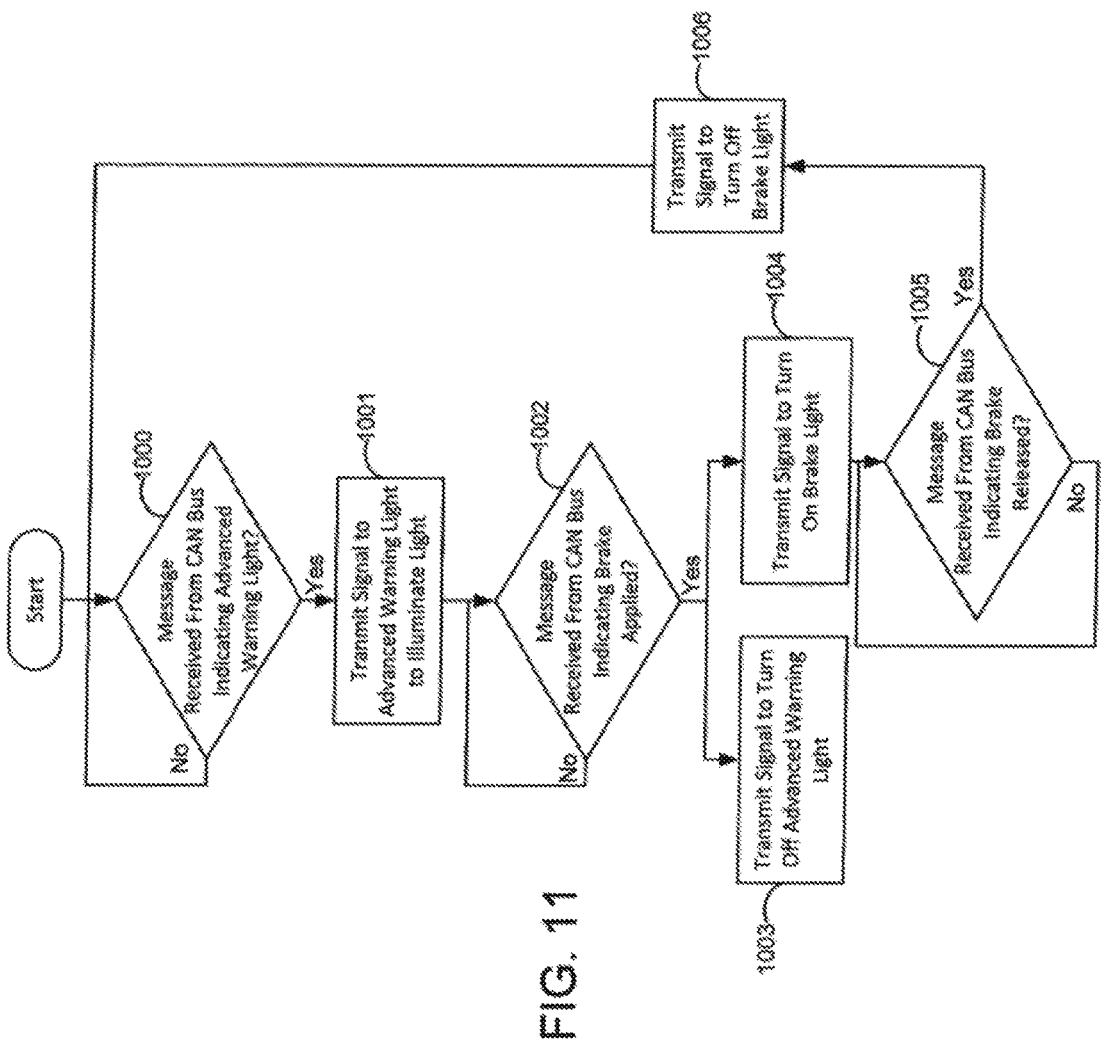
FIG. 11 is a flowchart of exemplary architecture and functionality of the advanced warning light system such as is depicted in FIG. 6.

FIG. 11 is a flowchart of exemplary architecture and functionality of the advanced warning light system depicted in FIGS. 5 and 6.

In step 1000, a message is received from the CAN bus 508 (FIG. 5) or CAN bus 608 (FIG. 6) (hereinafter referred to as the "CAN buses"). If the message contains data that indicates that a parameter has been detected that specifies that the vehicle is slowing down, then the system 500 (FIG. 1) or system 600 (FIG. 6) (hereinafter referred to as "systems") proceeds to step 1001. If the message does not contain data that indicates that a parameter has been detected that specifies that the vehicle is slowing down, the systems continue to listen for messages in step 1000.

In step 1001, if the message indicates that the vehicle is slowing down, the systems transmit a signal to the advanced warning light to illuminate the light. Note that in system 500, the signal is transmitted by the power distribution controller 506 (FIG. 5). However, in system 600, the signal is transmitted by the light controller 610 (FIG. 6). In either scenario, the signal transmitted indicates that the advanced warning light is to be activated. Note that there are a variety of messages that may indicate that the vehicle is slowing down. As mere examples, the message may indicate a change in speed (the vehicle is slowing down) or the message may indicate that pressure has been alleviated from the accelerator.

If a message is received from the CAN buses that the brake has been applied in step 1002, the systems proceed to steps 1003 and 1004. In this regard, the systems transmit a signal to turn off the advanced warning light 804 (FIG. 8) and 1004 (FIG. 10) in step 1003 and transmit a signal to turn on the brake light 805 (FIG. 8) and brake light 1005 (FIG. 10) in step 1004. If no message is received indicating that pressure has been applied to the brake, the systems continue to listen to messages in step 1002.

If a message is received from the CAN buses that the brake has been release in step 1005, the systems proceed to step 1006. In this regard, the systems transmit a signal to turn off the brake lights 805 and 1005. Until the message is received, the brake lights 805 and 1005 remain on in step 1005.

Figure 12:
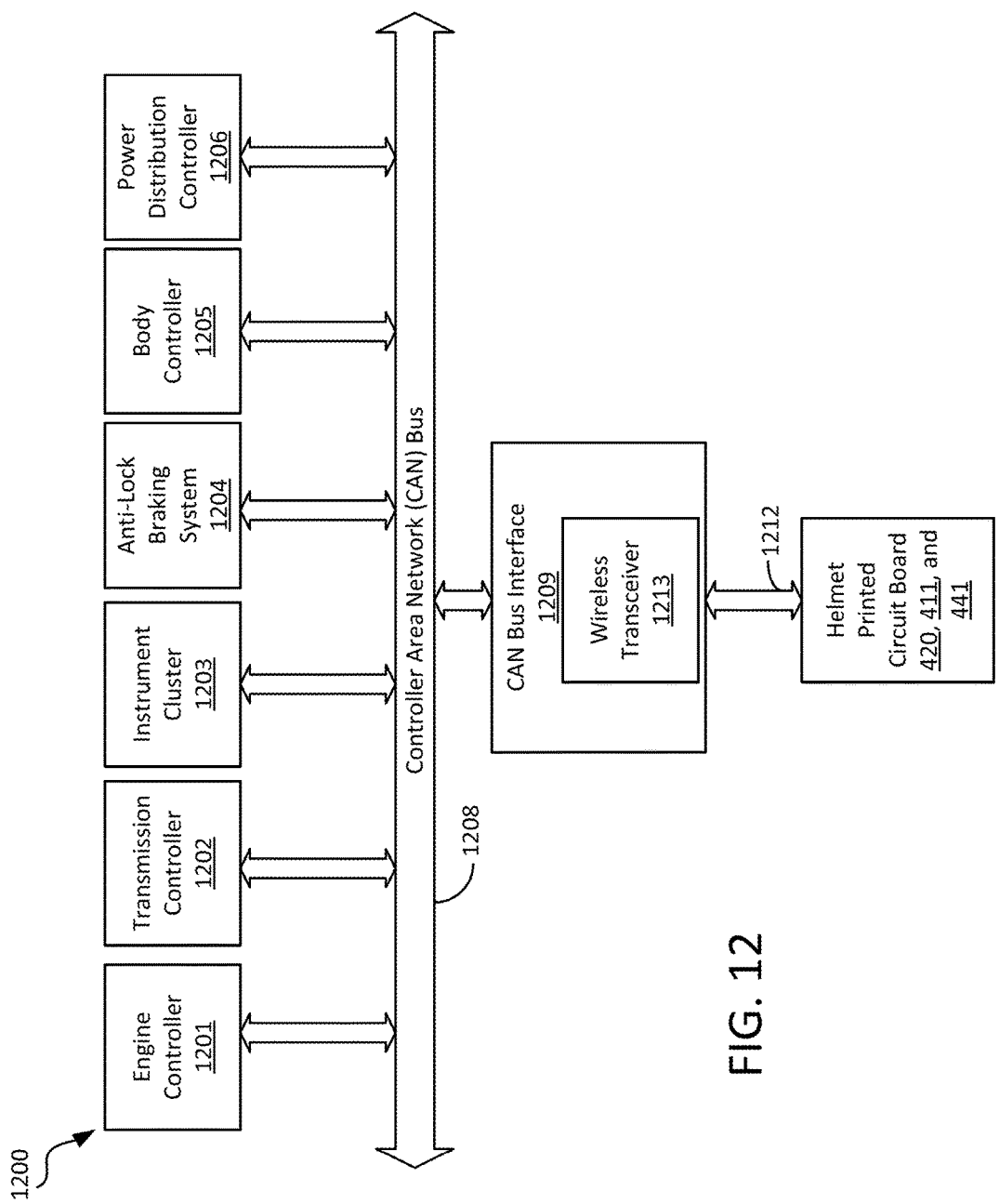
FIG. 12 is a block diagram of an exemplary advanced signal warning light system used with a helmet.

FIG. 12 is an embodiment of an advanced warning lighting system 1200 in a motorcycle 402 (FIG. 4B) wherein there are advanced warning lights 405 (FIG. 4C), 412 (FIG. 4E), and 443 (FIG. 4G) in a rider's helmet in accordance with an embodiment of the present disclosure. The motorcycle 402 comprises an engine controller 1201, a transmission controller 1202, an instrument cluster 1203, and ABS 1204, a body controller 1205, and a power distribution controller 1206. As described above, each of these controllers 1201-1206 monitors certain parameters of the vehicle and transmits messages across the CAN bus 608 related to the parameters monitored.

In addition, the advanced warning lighting system 1200 comprises a CAN bus interface 1209. The CAN bus interface 1209 is communicatively coupled to one of the PCB 420 (FIG. 4D), the PCB 411 (FIG. 4F) or the PCB 441 (FIG. 4H). In this regard, the CAN bus may comprise a wireless transceiver 1213 for transmitting messages to the PCB 420, the PCB 411, or the PCB 441. In the alternative, the CAN bus may be hard-wired to the PCB 420, the PCB 411, or the PCB 441.

In operation, the CAN bus interface 1209 receives messages from the controllers 1201-1206. The CAN bus interface 1209 analyzes messages from the controllers 1201-1206 to determine if the advanced warning light should be illuminated. In one embodiment, if the CAN bus interface 1209 receives a message that pressure has been alleviated from the throttle, this indicates that the advanced warning light should be illuminated.

The CAN bus interface transmits data indicative of the message to illuminate advanced warning lights to the PCB 420, the PCB 411, or the PCB 441. As indicated, the connection 1212 may be a wireless connection; however, in another embodiment, the connection 1212 is a wired connection.

Upon receipt of the message, the PCB 420, the PCB 411, or the PCB 441 activates or deactivates the advanced warning lights 405 (FIG. 4C), 412 (FIG. 4E) and 443 (FIG. 4G), respectively, based upon the message received. When activated, this indicates to a following vehicle that the motorcycle is slowing down.

What we claim is:

1. An advanced warning light system, comprising:
    a controller area network (CAN) bus for transmitting messages;
    at least one controller configured for monitoring operations of a motorcycle, the at least one controller further configured for transmitting a message on the CAN bus when a monitored operation occurs on the motorcycle, the message comprising data indicating that the motorcycle is slowing down;
    a CAN bus interface configured for receiving messages from the controller via the CAN bus, analyzing the received messages to determine if the motorcycle is decelerating, and transmitting a signal comprising data indicating to illuminate an advanced warning light if the motorcycle is slowing down; and
    a processor on a printed circuit board (PCB) contained in a helmet is configured for receiving the signal from the CAN bus interface, the processor further configured for illuminating the advanced warning light coupled to the PCB on a back of the helmet being worn by a rider to indicate to a driver following the motorcycle that the motorcycle is slowing down in response to the signal.

2. The advanced warning light system of claim 1, wherein the at least one controller is an engine controller that monitors a speed of the motorcycle and a throttle position of the motorcycle.

3. The advanced warning light system of claim 2, wherein the engine controller transmits a message on the CAN bus indicating the speed of the motorcycle has decreased or that pressure has been removed from the accelerator.

4. The advanced warning light system of claim 1, wherein the helmet comprises the printed circuit board (PCB) mounted on an inside surface of the helmet.

5. The advanced warning light system of claim 4, wherein the PCB is electrically connected to a strip of lights adhesively mounted on an outside surface of the helmet via a cable that traverses the outside surface of the helmet and is installed under an edge of the helmet.

6. The advanced warning light system of claim 4, wherein the PCB is electrically connected to a strip of lights mounted on an inside surface of the helmet.

7. The advanced warning light system of claim 6, wherein the lights protrude through a plurality of openings in the helmet.

8. The advanced warning light system of claim 1, further comprising a CAN bus interface configured for determining whether the motorcycle is slowing down.

9. The advanced warning light system of claim 8, wherein the CAN bus interface comprises a wireless transceiver.

10. The advanced warning light system of claim 9, wherein the PCB comprises a wireless transceiver.

11. The advanced warning light system of claim 10, wherein the CAN bus interface is configured to determine whether the motorcycle is slowing down based upon the message.

12. The advanced warning light system of claim 11, wherein the CAN bus interface transmits the message to the PCB.

13. The advanced warning light system of claim 8, wherein the CAN bus interface has a wired interface.

14. The advanced warning light system of claim 13, wherein the printed circuit board (PCB) is coupled to the CAN bus interface via a cable to the wired interface.

15. The advanced warning light system of claim 1, wherein the helmet comprises a cable.

16. The advanced warning light system of claim 15, wherein the cable is configured to provide power to a printed circuit board mounted on an inside surface of the helmet.

17. The advanced warning light system of claim 15, wherein the cable is coupled to the CAN bus and is configured to transmit messages from the CAN bus to a printed circuit board mounted on an inside surface of the helmet.

* * * * *